United States Patent
Takebe

(10) Patent No.: US 7,543,135 B2
(45) Date of Patent: Jun. 2, 2009

(54) PROCESSOR AND METHOD FOR SELECTIVELY PROCESSING INSTRUCTION TO BE READ USING INSTRUCTION CODE ALREADY IN PIPELINE OR ALREADY STORED IN PREFETCH BUFFER

(75) Inventor: Yoshimasa Takebe, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 111 days.

(21) Appl. No.: 11/497,290

(22) Filed: Aug. 2, 2006

(65) Prior Publication Data

US 2007/0260858 A1    Nov. 8, 2007

(30) Foreign Application Priority Data

Mar. 23, 2006 (JP) .............................. 2006-081483

(51) Int. Cl.
*G06F 7/00* (2006.01)

(52) U.S. Cl. ...................................... 712/226

(58) Field of Classification Search ............... 712/226, 712/207

See application file for complete search history.

(56) References Cited

U.S. PATENT DOCUMENTS

| | | | | |
|---|---|---|---|---|
| 5,423,048 A | * | 6/1995 | Jager | .......................... 712/207 |
| 6,618,803 B1 | * | 9/2003 | Hannum et al. | ............. 712/225 |
| 6,895,496 B1 | * | 5/2005 | Taniguchi et al. | ........... 712/207 |
| 6,959,379 B1 | * | 10/2005 | Wojcieszak et al. | ......... 712/241 |
| 2004/0268085 A1 | * | 12/2004 | Hara et al. | .................. 711/213 |

FOREIGN PATENT DOCUMENTS

JP    2003-228483    8/2003

* cited by examiner

*Primary Examiner*—Eric Coleman
(74) *Attorney, Agent, or Firm*—Staas & Halsey LLP

(57) ABSTRACT

There is provided a processor including: an instruction pipeline pipeline-processing an instruction code; a comparison unit that compares an instruction code in the instruction pipeline or in an instruction prefetch buffer and an instruction code to be read next from an instruction cache memory or from a main memory, to judge whether or not the instruction codes are identical with each other; and a control unit whose control when the instruction codes are identical with each other is to read the instruction code neither from the instruction cache memory nor from the main memory but to process the instruction code stored in the instruction pipeline or in the instruction prefetch buffer again in the instruction pipeline or in the instruction prefetch buffer.

8 Claims, 2 Drawing Sheets

F I G. 1
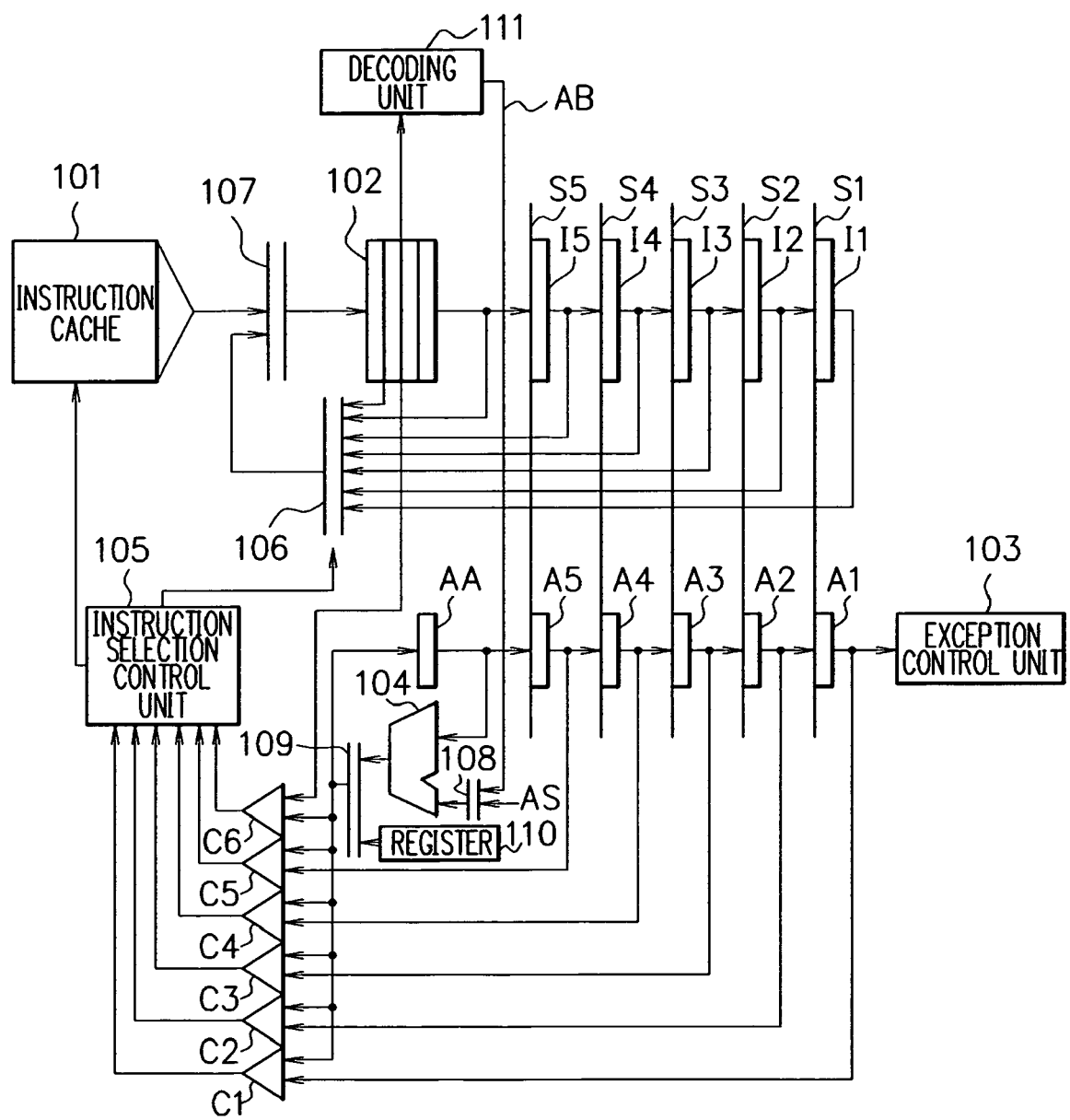

US 7,543,135 B2

PROCESSOR AND METHOD FOR SELECTIVELY PROCESSING INSTRUCTION TO BE READ USING INSTRUCTION CODE ALREADY IN PIPELINE OR ALREADY STORED IN PREFETCH BUFFER

CROSS-REFERENCE TO RELATED APPLICATIONS

This application is based upon and claims the benefit of priority from the prior Japanese Patent Application No. 2006-081483, filed on Mar. 23, 2006, the entire contents of which are incorporated herein by reference.

BACKGROUND OF THE INVENTION

1. Field of the Invention

The present invention relates to a processor and a processing method of the same.

2. Description of the Related Art

FIG. 3 is a diagram showing a configuration example of a processor. An instruction prefetch buffer 302 prefetches an instruction code from an instruction cache memory 301 to store the instruction code. Stages S1 to S5 constitute an instruction pipeline and sequentially pipeline-process the instruction codes stored in the instruction prefetch buffer 302. For instance, the instruction code stored in the instruction prefetch buffer 302 is decoded in the stage S1, then is executed in the stage S2, and then is written back in the stage S3. An instruction code I1 and an address A1 thereof are stored in the stage S1, an instruction code I2 and an address A2 thereof are stored in the stage S2, an instruction code I3 and an address A3 thereof are stored in the stage S3, an instruction code I4 and an address A4 thereof are stored in the stage S4, and an instruction code I5 and an address A5 thereof are stored in the stage S5.

An instruction address AA is an address to be sent to the stage S5 next. An arithmetic logic unit (ALU) 304 adds an instruction address AA and an offset address AS to output the instruction address AA for the next time. In a case where an instruction code is a 4-byte instruction, the offset address AS is "+4". By adding +4 to the instruction address AA each time, the instruction codes can be executed in address order.

An exception control unit 303 performs exception handling under interrupt control in such cases when an inexecutable instruction is executed. At this time, a current instruction address is temporarily saved and the saved instruction address is restored after the exception handling is finished, and then the processing before the interruption is resumed.

Japanese Patent Application Laid-open No. 2003-228483 describes a microprocessor in which a co-processor control unit intercepts address outputting from a CPU to a cache memory so that an address is not supplied to the cache memory when an execution address is outputted from the CPU to the co-processor.

Every time an instruction is to be executed, the above-described processor reads an instruction code from the cache memory 301 or a main memory. For instance, a processor operating at 1 GHz needs to access the memory more than 1 billion times, and accordingly, a ratio of power consumption of the instruction cache memory 301 has reached several tens % of the total power consumption of the processor. This problem is serious especially in a processor that executes a plurality of instructions simultaneously by using recent technologies such as superscalar or VLIW.

SUMMARY OF THE INVENTION

It is an object of the present invention to provide a processor and a processing method of the same capable of realizing a reduction in power consumption of an instruction cache memory by reducing the number of times instruction codes are read from the instruction cache memory.

According to one of the aspects of the present invention, provided is a processor including: an instruction pipeline pipeline-processing an instruction code; a comparison unit that compares an instruction code in the instruction pipeline or in an instruction prefetch buffer and an instruction code to be read next from an instruction cache memory or from a main memory, to judge whether or not the instruction codes are identical with each other; a control unit whose control when the instruction codes are identical with each other is to read the instruction code neither from the instruction cache memory nor from the main memory but to process the instruction code stored in the instruction pipeline or in the instruction prefetch buffer again in the instruction pipeline or in the instruction prefetch buffer.

BRIEF DESCRIPTION OF THE DRAWINGS

FIG. 1 is a diagram showing a configuration example of a processor according to an embodiment of the present invention;

DETAILED DESCRIPTION OF THE PREFERRED EMBODIMENTS

Figures 2, 3:
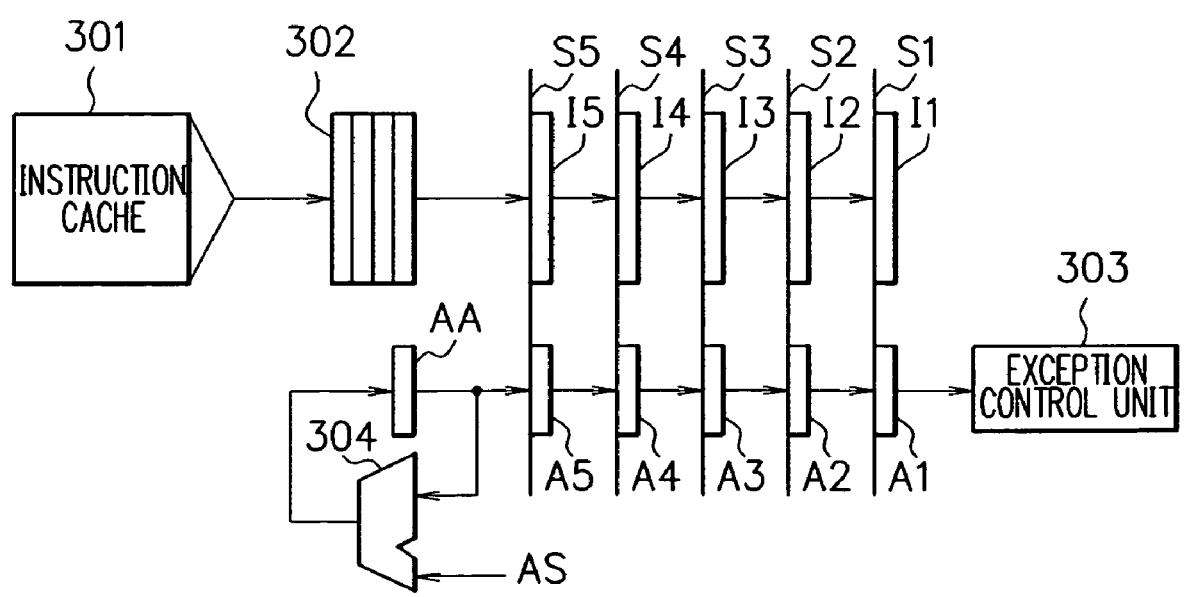
FIG. 2 is a chart showing an example of instruction addresses and instruction codes.
FIG. 3 is a diagram showing a configuration example of a processor.

FIG. 1 is a diagram showing a configuration example of a processor according to an embodiment of the present invention. An instruction cache memory 101, which is a RAM, stores part of instruction codes stored in a main memory. An instruction prefetch buffer 102 prefetches the instruction codes from the instruction cache memory 101 or from the main memory via a selector 107 and stores the prefetched instruction codes. Stages S1 to S5 constitute an instruction pipeline and sequentially pipeline-process the instruction codes stored in the instruction prefetch buffer 102. For instance, the instruction codes in the instruction prefetch buffer 102 are decoded in the stage S1, then are executed in the stage S2, and then are written back in the stage S3.

For instance, an instruction code I1 and its address A1 are stored in the stage S1, an instruction code I2 and its address A2 are stored in the stage S2, an instruction code I3 and its address A3 are stored in the stage S3, an instruction code I4 and its address A4 are stored in the stage S4, and an instruction code I5 and its address A5 are stored in the stage S5. An instruction address AA is an address to be sent to the first stage S5 next time.

FIG. 2 is a chart showing an example of instruction addresses and instruction codes. The instruction code I1 is stored in the instruction address A1, the instruction code I2 is stored in the instruction address A2, the instruction code I3 is stored in the instruction address A3, the instruction code I4 is stored in the instruction address A4, the instruction code I5 is stored in the instruction address A5, and an instruction code I6 is stored in an instruction address A6. These instruction codes are stored in the main memory and/or the instruction cache memory 101. For instance, the instruction code I6 is a branch instruction (jump instruction). The instruction codes I1 to I5 are executed in sequence, and the instruction code I6 instructs a jump to the instruction address A1. Processing in this case is loop processing where the instruction codes I1 to I5 are executed again after the instruction codes I1 to I5 are executed.

First, in FIG. 1, a case where the instruction codes are executed in address order such as in order from the instruction code I1 to the instruction code I5 will be described. A selector 108 selects an offset address AS and outputs it to an arithmetic logic unit (ALU) 104. The ALU 104 adds the instruction address AA and the offset address AS to output a new instruction address AA. At this time, a selector 109 selects the output of the ALU 104 to output the new instruction address AA. In a case where the instruction code is a four-byte instruction, the offset address AS is "+4". By adding +4 to the instruction address AA each time, the instruction codes I1 to I5 can be executed in address order.

Next, a case where the instruction code I6 is a branch instruction will be described. Available methods for designating a branch destination address by the branch instruction are program counter (PC) relative address designation (self-relative address designation) and absolute address designation. The PC relative address designation will be described first. In order to simplify the description, a case where the capacity of the instruction prefetch buffer 102 corresponds to one instruction code will be described as an example. The instruction code I6 is stored in the instruction prefetch buffer 102. The instruction address AA corresponding to the instruction code I6 is the address A6. The address A6 is an address resulting from the addition of "+4" to the address A5. A decoding unit 111 reads the instruction code I6 from the instruction prefetch buffer 102. The instruction code I6 has an operation code and a branch destination address field. When the operation code of the instruction code I6 is a branch instruction, the decoding unit 111 outputs a branch offset AB in the branch destination address field to the selector 108. The selector 108 selects the branch offset AB and outputs it to the ALU 104. The ALU 104 adds the instruction address AA and the branch offset AB to output a new instruction address AA. At this time, the selector 109 selects the output of the ALU 104 to output it as a new instruction address AA. For instance, a current instruction address AA is the address A6, the branch offset AB is "−20", and the ALU 104 outputs the address A1.

A comparison circuit C1 compares the instruction address A1 in the stage S1 and the new instruction address AA which is the output of the selector 109, and if they are identical with each other, the comparison circuit C1 outputs 1, and if not, it outputs 0. A comparison circuit C2 compares the instruction address A2 in the stage S2 and the new address AA which is the output of the selector 109, and if they are identical with each other, the comparison circuit C2 outputs 1, and if not, it outputs 0. A comparison circuit C3 compares the instruction address A3 in the stage S3 and the new address AA which is the output of the selector 109, and if they are identical with each other, the comparison circuit C3 outputs 1, and if not, it outputs 0. A comparison circuit C4 compares the instruction address A4 in the stage S4 and the new address AA which is the output of the selector 109, and if they are identical with each other, the comparison circuit C4 outputs 1, and if not, it outputs 0. A comparison circuit C5 compares the instruction address A5 in the stage S5 and the new instruction address AA which is the output of the selector 109, and if they are identical with each other, the comparison circuit C5 outputs 1, and if not, it outputs 0. A comparison circuit C6 compares the instruction address in the instruction prefetch buffer 102 and the new address AA which is the output of the selector 109, and if they are identical with each other, the comparison circuit C6 outputs 1, and if not, it outputs 0. The instruction prefetch buffer 102 stores an instruction code and a corresponding instruction address, and it may store a plurality of instruction codes.

An instruction selection control unit 105 controls a selector 106 according to the outputs of the comparison circuits C1 to C6. The selector 106 selects the instruction code I1 in the stage S1 when the comparison circuit C1 outputs 1, selects the instruction code I2 in the stage S2 when the comparison circuit C2 outputs 1, selects the instruction code I3 in the stage S3 when the comparison circuit C3 outputs 1, selects the instruction code I4 in the stage S4 when the comparison circuit C4 outputs 1, selects the instruction code I5 in the stage S5 when the comparison circuit C5 outputs 1, and selects the instruction code in the instruction prefetch buffer 102 when the comparison circuit C6 outputs 1. Then, the selector 106 outputs the selected instruction code to the selector 107. Under the control of the instruction selection control unit 105, the selector 107 selects the instruction code outputted by the selector 106 when any one of the comparison circuits C1 to C6 outputs 1, while selecting the instruction code outputted by the instruction cache 101 or the main memory when all of the comparison circuits C1 to C6 output 0. Then, the selector 107 outputs the selected instruction code to the instruction prefetch buffer 102. When any one of the comparison circuits C1 to C6 outputs 1, the instruction selection control unit 105 outputs an access restraining signal to the instruction cache memory 101. When the access restraining signal is inputted, the instruction cache memory 101 makes any access, so that power consumption can be reduced.

An exception control unit 103 performs exception handling under interrupt control in such cases when an unexecutable instruction is executed. At this time, a current instruction address is temporarily saved and the saved instruction address is restored after the exception handling is finished. Then, the processing that was performed before the interruption is resumed.

For instance, in a case where the decoding unit 111 decodes the branch instruction code I6 to output the branch offset AB, the instruction address outputted from the selector 109 is identical with the address A1. In such a case, the comparison circuit C1 outputs 1, and the comparison circuits C2 to C6 output 0. The selector 106 selects the instruction code I1 in the stage S1 and outputs it to the selector 107. The selector 107 selects the instruction code I1 which is the output of the selector 106, and outputs it to the instruction prefetch buffer 102. The instruction prefetch buffer 102 stores the instruction code I1. The instruction cache memory 101 receives the access restraining signal from the instruction selection control unit 105 so as to perform no access. As described above, since the instruction code I1 has already existed in the stage S1, the instruction prefetch buffer 102 stores it again. At this time, since no read is performed from the instruction cache memory 101, power consumption can be reduced. The address A1 is defined as the instruction address AA.

Next, the selector 108 selects the offset address AS to output it to the ALU 104. The ALU 104 adds the instruction address AA and the offset address AS and outputs the result to the selector 109. For instance, the instruction address AA is the address A1, the offset address AS is "+4", and the ALU 104 outputs the address A2. The selector 109 selects the output of the ALU 104. The instruction codes are actually shifted in the pipeline constituted by the stages S1 to S5, but for simplifying the description, the description will be given on the assumption that the stages S1 to S5 are in the state shown in FIG. 1. In this case, the comparison circuit C2 outputs 1, and the comparison circuits C1, C3 to C6 output 0. The selector 106 selects the instruction code I2 in the stage S and outputs it to the selector 107. The selector 107 selects the instruction code I2 which is the output of the selector 106 and outputs it to the instruction prefetch buffer 102. The instruction prefetch buffer 102 stores the instruction code I2. The instruction cache memory 101 receives the access restraining signal from the instruction selection control unit 105 so as to make no access. Since no read is performed from the instruction cache memory 101, power consumption can be reduced.

As described above, in a case where the branch instruction code I6 is a jump instruction to the instruction address A1, the instruction codes I1 to I5 are executed twice. Since the instruction codes I1 to I5 exist in the stages S1 to S5, the instruction codes I1 to I5 are reused so that no access is made to the instruction cache memory 101. This can reduce power consumption.

Furthermore, the instruction prefetch buffer 102 can store a plurality of instruction codes. In this case, the comparison circuit C6 compares the instruction addresses in the instruction prefetch buffer 102 and an instruction address outputted from the selector 109, and if they are identical with each other, the comparison circuit C6 outputs 1, and if not, it outputs 0. When the comparison circuit C6 outputs 1, the selector 106 selects the instruction code in the instruction prefetch buffer 102 and outputs it to the selector 107.

When an instruction code to be read from the instruction cache memory 101 next already exists in the stage S1 to S5 or in the instruction prefetch buffer 102, it is possible to reuse the above-described already existing instruction code to store the instruction code in the instruction prefetch buffer 102, without reading an instruction code from the instruction cache memory 101.

The following description will be on a case where the absolute address designation is used as the method for designating the branch destination address by the branch instruction. In a case where the instruction code I6 is a branch instruction, a branch destination address is stored in an address register 110. When judging that the instruction code I6 is a branch instruction with the absolute address designation, the decoding unit 111 controls the selector 109. The selector 109 selects and outputs the absolute address stored in the address register 110. The other processes are the same as those described in the PC relative address designation.

When all of the comparison circuits C1 to C6 output 0, the selector 107 selects an instruction code outputted by the instruction cache memory 101 under the control of the instruction selection control unit 105, and stores it in the instruction prefetch buffer 102. When no instruction code exists in the stages S1 to S5 and the instruction prefetch buffer 102, the selector 107 reads an instruction code from the instruction cache memory 101 or from the main memory and stores it in the instruction prefetch buffer 102. The instruction code in the instruction prefetch buffer 102 is pipeline-processed in the stages S1 to S5.

According to this embodiment, the comparison circuits C1 to C6 compare the instruction codes (instruction addresses) in the stages S1 to S5 of the instruction pipeline or in the instruction prefetch buffer 102, and the instruction code (instruction address) to be read next from the instruction cache memory 101 or from the main memory, and judges whether or not they are identical with each other. The control by the control unit 105 when the above instruction codes are identical with each other is to read the instruction code neither from the instruction cache memory 101 nor from the main memory, but to process the instruction code stored in the stages S1 to S5 of the instruction pipeline or in the instruction prefetch buffer 102 again in the stages S1 to S5 of the instruction pipeline or in the instruction prefetch buffer 102. The control by the control unit 105 when the above instruction codes are different from each other is to read the instruction code from the instruction cache memory 101 or from the main memory and to process the read instruction code in the stages S1 to S5 of the instruction pipeline. The decoding unit 111 decodes the instruction code stored in the instruction prefetch buffer 102, and when the instruction code is a branch instruction, the branch destination address thereof is defined as an address of an instruction code which is to be read next from the instruction cache memory or from the main memory.

Most of programs of instruction codes which processors execute are loop processing. In the case of the loop processing, an instruction code identical with an instruction code executed in the near past is executed again. Information on an instruction code executed in the very near past is highly probable to be left in the instruction prefetch buffer 102 or in the stages S1 to S5 of the instruction pipeline. Making the most of this specific feature, an address of an instruction code to be executed next and an address of an instruction code whose information is left in the instruction prefetch buffer 102 or in the stages S1 to S5 of the instruction pipeline are compared, and when the addresses are identical with each other, reading from the instruction cache memory 101 is restrained, and the instruction is executed by using the information left in the instruction prefetch buffer 102 or in the stages S1 to S5 of the instruction pipeline.

A significant effect is obtainable especially in a case where very short processing such as polling, memory clear, or transfer between memories is repeated. An effect of reducing power consumption by several percent to several tens percent can be expected in a case of reading from a flip flop, compared with power consumption in a case of reading from the instruction memory cache 101.

So far as information left in the instruction prefetch buffer 102 and the stages S1 to S5 of the instruction pipeline is used, there is hardly any increase in physical quantity. Another choice to widen the scope of application is to further prepare an exclusive buffer.

It is possible to reduce the number of times instruction codes are read from the instruction cache memory to reduce power consumption of the instruction cache memory by reusing instruction codes in the instruction prefetch buffer or in the instruction pipeline at the time of loop processing.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A processor, comprising:
   an instruction prefetch buffer storing an instruction code and its instruction address;
   an instruction pipeline storing said instruction code and its instruction address input from said instruction prefetch buffer, and pipeline-processing said instruction code;
   a comparison unit to which an instruction address in said instruction pipeline and an instruction address in said instruction prefetch buffer are input, that compares the input instruction address and an instruction address of an instruction code to be read next from an instruction cache memory or from a main memory, to judge whether or not the instruction addresses are identical with each other; and a control unit whose control, when the instruction addresses are identical with each other, is to read the instruction code neither from said instruction cache memory nor from said main memory but to process the instruction code stored in said instruction pipeline or in the instruction prefetch buffer again in said instruction pipeline or in the instruction prefetch buffer.

2. The processor according to claim 1, wherein said comparison unit compares an address of the instruction code in said instruction pipeline or in the instruction prefetch buffer and an address of the instruction code to be read next from the instruction cache memory or from the main memory, to judge whether or not the addresses are identical with each other, and wherein the control by said control unit, when the addresses of the instruction codes are identical with each other, is to read the instruction code neither from the instruction cache memory nor from said main memory but to process the instruction code stored in said instruction pipeline or in the instruction prefetch buffer again in said instruction pipeline or in the instruction prefetch buffer.

3. The processor according to claim 1, further comprising:

a decoding unit that decodes the instruction code in the instruction prefetch buffer, and when the instruction code is a branch instruction, makes a branch destination address of the branch instruction selectable as an address of the instruction code to be read next from the instruction cache memory or from the main memory.

4. The processor according to claim 1, wherein said control unit outputs an access restraining signal to the instruction cache memory when the instruction codes are identical with each other.

5. The processor according to claim 1, wherein the control by said control unit when the instruction codes are different from each other is to read the instruction code from the instruction cache memory or from the main memory and to process the read instruction code in said instruction pipeline.

6. The processor according to claim 1, wherein said comparison unit compares the instruction code in said instruction pipeline and the instruction code to be read next from the instruction cache memory, to judge whether or not the instruction codes are identical with each other, and wherein the control by said control unit when the instruction codes are identical with each other is not to read the instruction code from the instruction cache memory but to process the instruction code stored in said instruction pipeline again in said instruction pipeline.

7. The processor according to claim 1, wherein said comparison unit compares the instruction code in the instruction prefetch buffer and the instruction code to be read next from the instruction cache memory, to judge whether or not the instruction codes are identical with each other, and wherein the control by said control unit when the instruction codes are identical with each other is not to read the instruction code from the instruction cache memory but to process the instruction code stored in the instruction prefetch buffer again in the instruction prefetch buffer.

8. A processing method of a processor having an instruction pipeline pipeline-processing an instruction code, comprising:

storing an instruction code and its instruction address in an instruction prefetch buffer;

storing said instruction code and its instruction address, input from said instruction prefetch buffer, in an instruction pipeline and pipeline-processing said instruction code;

inputting an instruction address in said instruction pipeline and an instruction address in said instruction prefetch buffer to a comparison unit that compares the input instruction address and the instruction address an instruction code to be read next from an instruction cache memory or from a main memory to judge whether or not the instruction codes are identical with each other; and when the instruction codes are identical with each other, reading the instruction code neither from said instruction cache memory nor from said main memory but processing the instruction code stored in the instruction pipeline or in the instruction prefetch buffer again in the instruction pipeline or in the instruction prefetch buffer.

* * * * *